US008718082B2

(12) United States Patent
Takeuchi et al.

(10) Patent No.: US 8,718,082 B2
(45) Date of Patent: May 6, 2014

(54) NETWORK SYSTEM OF TIME BAND RESERVATION, FRAME TRANSFER METHOD, AND NETWORK DEVICE

(75) Inventors: Junichi Takeuchi, Kanagawa (JP); Naoto Iga, Kanagawa (JP); Hideki Goto, Okazaki (JP); Shinichi Iiyama, Tokyo-to (JP)

(73) Assignees: Toyota Jidosha Kabushiki Kaisha, Toyota-shi (JP); Renesas Electronics Corporation, Kawasaki (JP)

( * ) Notice: Subject to any disclaimer, the term of this patent is extended or adjusted under 35 U.S.C. 154(b) by 846 days.

(21) Appl. No.: 12/934,880

(22) PCT Filed: Mar. 26, 2009

(86) PCT No.: PCT/IB2009/005313
§ 371 (c)(1),
(2), (4) Date: Oct. 27, 2010

(87) PCT Pub. No.: WO2009/118648
PCT Pub. Date: Oct. 1, 2009

(65) Prior Publication Data
US 2011/0051751 A1    Mar. 3, 2011

(30) Foreign Application Priority Data
Mar. 26, 2008    (JP) .................. 2008-080667

(51) Int. Cl.
*H04B 7/212*    (2006.01)
*H04W 28/26*    (2009.01)

(52) U.S. Cl.
CPC .................................... *H04W 28/26* (2013.01)
USPC ........................................................ 370/443

(58) Field of Classification Search
USPC .................................. 370/256, 350, 348, 443
See application file for complete search history.

(56) References Cited

U.S. PATENT DOCUMENTS

| 6,931,028 B1 | 8/2005 | Hock | |
|---|---|---|---|
| 8,014,401 B2 * | 9/2011 | Radulescu | 370/392 |
| 2002/0059432 A1 * | 5/2002 | Masuda et al. | 709/227 |

FOREIGN PATENT DOCUMENTS

| JP | 2000-224216 A | 8/2000 |
|---|---|---|
| JP | 2002 185491 | 6/2002 |

(Continued)

OTHER PUBLICATIONS

Hoga, Clemens: "New Ethernet Technologies for Substation Automation", Power Tech, pp. 707-712, XP031269463, ISSN: 978-1-4244-2189-3, (Jul. 1, 2007).

(Continued)

*Primary Examiner* — Mark Rinehart
*Assistant Examiner* — Matthew Hopkins
(74) *Attorney, Agent, or Firm* — Oblon, Spivak, McClelland, Maier & Neustadt, L.L.P.

(57) ABSTRACT

In a network system of this invention including a plurality of network devices that transfer frames by repeating, in a constant cycle, a reserved transfer interval that is a time band, in which a frame is transferred with a reservation and a free transfer interval that is a time band, in which a frame is freely transferred, a relay network device that links a first network device that is a transmission source of a frame and a second network device that is a transmission destination of the frame and the first network device execute a reservation processing such that the same time band within the reserved transfer interval is reserved and transfer the frame from the first network device to the second network device on the basis of the reservation result.

18 Claims, 16 Drawing Sheets

(56) References Cited

FOREIGN PATENT DOCUMENTS

| | | |
|---|---|---|
| JP | 2003-309581 A | 10/2003 |
| WO | 00 72156 | 11/2000 |

OTHER PUBLICATIONS

International Search Report issued Jul. 13, 2009 in PCT/IB09/05313 filed Mar. 26, 2009.

* cited by examiner

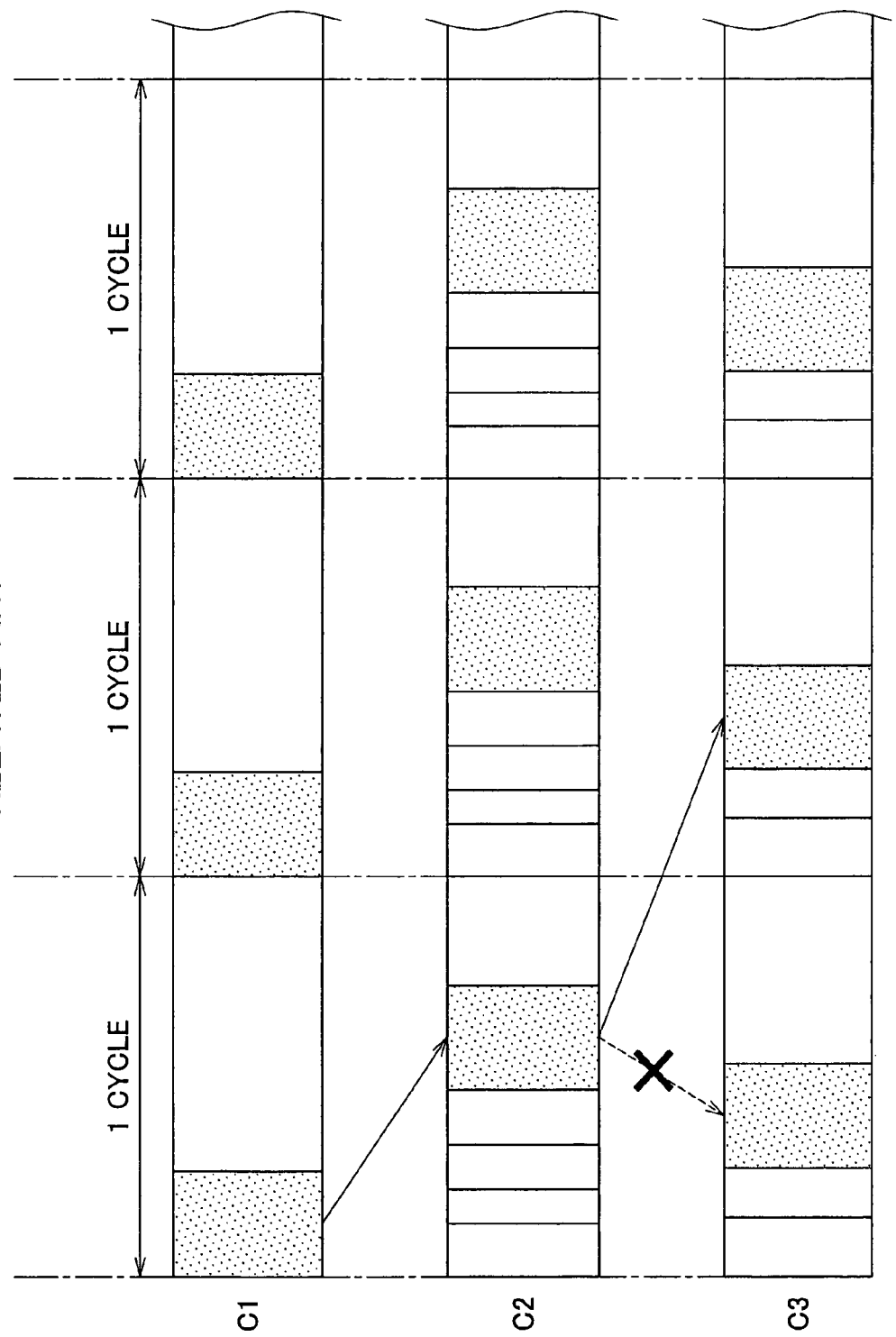

US 8,718,082 B2

NETWORK SYSTEM OF TIME BAND RESERVATION, FRAME TRANSFER METHOD, AND NETWORK DEVICE

BACKGROUND OF THE INVENTION

1. Field of the Invention

This invention relates to a network system of a time band reservation, a frame transfer method, and a network device.

2. Description of the Related Art

Real-time communication technology such as Institute of Electrical and Electronic Engineers (IEEE) 1394 employs a transfer system (referred to hereinbelow as "cyclic transfer") using a cycle including real time data and best effort data. FIG. 14 shows a standard cycle pattern. As shown in FIG. 14, cycles are repeated by taking predetermined 125 μs as one cycle. Packet data, that is, a frame, occupying a predetermined band within this one cycle is transferred between network devices. Here, the first half of one cycle is taken as a reserved transfer interval and the second half is taken as a free transfer interval.

The reserved transfer interval is used for real time data communication. In the reserved transfer interval, for example, as shown in FIG. 14, a predetermined time, that is, time bands 1 to 5 are reserved for frame transmission. The reserved time bands 1 to 5 are used only between the respective set devices. Where frames A1 to A5 of real time data are arranged in the reserved time bands 1 to 5, a constant amount of data communication is possible within a constant time. A synchronization frame for synchronizing the network devices is disposed in the header of the reserved transfer interval (not shown in the figure).

By contrast, the free transfer interval is used for best effort data communication that has no real time property. In this interval, no band is reserved. For example, as shown in FIG. 14, where a time band 6 of this interval is free during data transfer, a frame B1 is arranged therein and data communication between the devices is performed. Frames B2 to B5 are similarly arranged in respective bands.

For example, a daisy-chain connection composed of network devices 11 to 14 shown in FIG. 15 and a star connection composed of network devices 11, 12, 13, and 15 can be considered as a network configuration that realizes a cyclic transfer. Each network device has a bridge function, and network devices 12, 13, and 15 can transfer a frame transmitted from a network device on one side of the device to a network device on the other side. As a result, communication can be performed by using a bridge function even between the network devices that are not directly connected to each other.

There is a trend to applying the above-described cyclic transfer to Ethernet (registered trademark), which is a Local Area Network (LAN) standard, and high speed and high reliability of data communication with the cyclic transfer are sought for a LAN using the Ethernet (registered trademark).

Japanese Patent Application Publication No. 2002-185491 (JP-A-2002-185491) discloses a feature of reserving network resources among the devices. More specifically, in response to a reservation request message from a first terminal device, each node device determines whether reservation is possible, performs pre-reservation if reservation is possible, and sends a request message to the next device. The second terminal device determines adaptability for data communication in response to the request message and sends a "Reservation Possible" or "Reservation Impossible" response message to the preceding device. Upon receiving the "Reservation Possible" response message, each node device changes the pre-reservation to main reservation. In this case, whether reservation is possible is determined based on whether or not a reservation resource amount exceeds a resource amount allocated to each node device.

A case in which the method disclosed in JP-A-2002-185491 is applied to the cyclic transfer will be explained below. A case will be considered in which data are transferred from the network device 11 to the network device 14 via the network devices 12 and 13 shown in FIG. 15. In this case, as shown in FIG. 15, a transmission port C1 of the network device 11 is connected to the network device 12 by a cable. Likewise, a transmission port C2 of the network device 12 is connected to the network device 13 and a transmission port C3 of the network device 13 is connected to the network device 14 by a cable.

FIG. 16 shows an example of transfer cycle in the transmission ports of each device shown in FIG. 15. Let us focus attention on a reserved frame (hatched portion) transmission from the transmission port of each device. The reserved time in each device differs from that in another device although one reserved transfer is ensured for one cycle in each device. This is because in the method disclosed in JP-A-2002-185491, reservation is performed by determining whether reservation is possible based on the resource amount when a reservation message is received from a preceding device. Because a delay time required to process the message and a delay time caused by a cable between the devices occur in each device, the transfer is performed with a delay of the reservation request message itself. As a result, as shown in FIG. 16, each device has different reserved time. This delay increases with the increase in the number of relay devices from the device that is a frame transmission source to the device that is a transmission destination, that is, with the increase in the hop number.

In the configuration shown in FIG. 16, the reservation cycle of port C3 differs from those of C1 and C2. In this case, the delay is equal to or greater than one cycle. With certain data to be transmitted, it is desirable that the transfer be performed within one cycle, and this is difficult to do with the transfer method using the reservation described in JP-A-2002-185491.

SUMMARY OF THE INVENTION

A network system according to the first aspect of the invention includes a plurality of network devices that transfer frames by repeating, in a constant cycle, a reserved transfer interval that is a time band, in which a frame is transferred with a reservation, and a free transfer interval that is a time band, in which a frame is freely transferred, wherein a relay network device, which links a first network device that is a transmission source of a frame and a second network device that is a transmission destination of the frame, and the first network device execute a reservation processing such that the same time band within the reserved transfer interval is reserved and transfer the frame from the first network device to the second network device on the basis of the reservation result.

In the network system according to the first aspect, the first network device may transmit a pre-reserved frame including time band information for reserving the frame to the relay network device, and the time band information may include a request time band that is required to transmit the frame and information on reservation start time and end time.

Furthermore, in the network system according to the first aspect, the relay network device may be provided with a reservation table including reserved time band information and may determine whether reservation is possible based on the time band information of the received pre-reserved frame and time band information of the reservation table.

Furthermore, in the network system according to the first aspect, the relay network device may determine that reservation is possible when a free time band that is equal to or greater than the required time band is present within the reservation start time and end time.

Furthermore, in the network system according to the first aspect, the relay network device may produce and transmit the pre-reserved frame by taking the free time band as the start time and end time, or may produce and transmit a reservation check frame by taking the free time band as a reservation check time band when the reservation is determined to be possible.

Furthermore, in the network system according to the first aspect, the reservation processing may be prohibited when a hop number from the first network device to the second network device exceeds a predetermined value.

Furthermore, in the network system according to the first aspect, a design ID may be assigned to all network devices within the network other than root nodes, and whether each network device prioritizes a reservation from any of the network devices may be determined based on the device ID, whereby the reservation processing may be executed.

Furthermore, in the network system according to the first aspect, a pre-reserved frame including time band information for reserving the frame may be transmitted from the first network device to the relay network device; and the pre-reserved frame may include information of the device ID.

A frame transfer method according to the second aspect of the invention is performed in a plurality of network devices by repeating, in a constant cycle, a reserved transfer interval that is a time band, in which a frame is transferred with a reservation and a free transfer interval that is a time band, in which a frame is freely transferred, the method being characterized by including: executing, by a relay network device, which links a first network device that is a transmission source of a frame and a second network device that is a transmission destination of the frame, and the first network device, a reservation processing for reserving the same time band within the reserved transfer interval; and transferring the frame from the first network device to the second network device on the basis of the reservation result.

Furthermore, in the frame transfer method according to the second aspect, the first network device may transmit a pre-reserved frame including time band information for reserving the frame to the relay network device, and the time band information may include a request time band that is required to transmit the frame and information on reservation start time and end time.

Furthermore, in the frame transfer method according to the second aspect, the relay network device may be provided with a reservation table including reserved time band information and may determine whether reservation is possible based on time band information of the received pre-reserved frame and time band information of the reservation table.

Furthermore, in the frame transfer method according to the second aspect, the relay network device may determine that reservation is possible when a free time band that is equal to or greater than the required time band is present within the reservation start time and end time.

Furthermore, in the frame transfer method according to the second aspect, the relay network device may produce and transmit the pre-reserved frame by taking the free time band as the start time and end time, or may produce and transmit a reservation check frame by taking the free time band as a reservation check time band when the reservation is found to be possible.

Furthermore, in the frame transfer method according to the second aspect, the reservation processing may be prohibited when a hop number from the first network device to the second network device exceeds a predetermined value.

Furthermore, in the frame transfer method according to the second aspect, a device ID may be assigned to all network devices within the network other than root nodes, and whether each network device prioritizes a reservation from any of the network devices may be determined based on the device ID, whereby the reservation processing may be executed.

Furthermore, in the frame transfer method according to the second aspect, a pre-reserved frame including time band information for reserving the frame may be transmitted from the first network device to the relay network device, and the pre-reserved frame may include information of the device ID.

A network device according to the third aspect of the invention is a network device that transfers frames by repeating, in a constant cycle, a reserved transfer interval that is a time band, in which a frame is transferred with a reservation and a free transfer interval that is a time band, in which a frame is freely transferred, the network device including: a reservation table including time band information that has been reserved within the reserved transfer interval; and a reservation management unit that receives a pre-reserved frame including a request time band required for transmitting a frame from another network device and information on reservation start time and end time and determines whether reservation is possible on the basis of the time band information of the reservation table, the request time band, and the start time and end time.

Furthermore, in the network device according to the third aspect, the reservation management unit may determine that reservation is possible when a free time band that is equal to or greater than the required time band is present within the reservation start time and end time.

Furthermore, in the network device according to the third aspect, the reservation management unit may produce and transmit the pre-reserved frame by taking the free time band as the start time and end time, or may produce and transmit a reservation check frame by taking the free time band as a reservation check time band when the reservation is determined to be possible.

With the invention, a reserved frame can be transferred with a small delay.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 16 serves to illustrate the object of the invention in relation to the related technology.

DETAILED DESCRIPTION OF EMBODIMENTS

A specific embodiment employing the invention will be described below in greater detail with reference to the appended drawings. However, the invention is not limited to the below-described embodiment. Furthermore, the description and drawings below are appropriately simplified to clarify the explanation.

Figure 1:
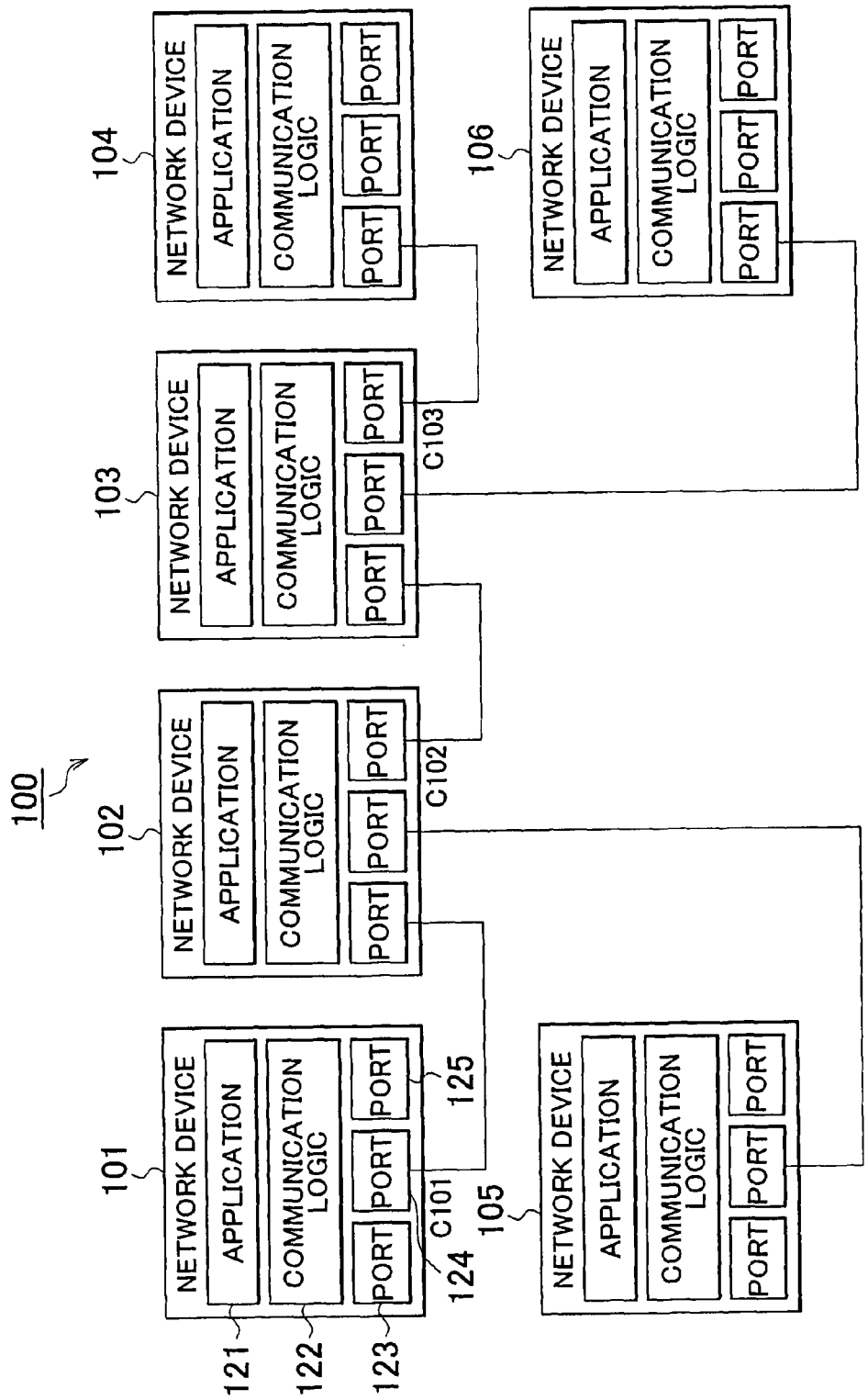
FIG. 1 is a schematic diagram of a network of the embodiment of the invention.

FIG. 1 shows a general network configuration and a network device of the embodiment. As shown in FIG. 1, a network 100 has network devices 101 to 106. The network devices 101 to 106 perform transmission and reception of frames by cyclic transfer. Because the network devices 101 to 106 have identical configuration, the network device 101 will be explained herein by way of example. The network device 101 has an application 121, a communication logic 122, and ports 123 to 125.

The application 121 generates data to be used in another network device in the network or uses data generated in another network device. Examples of the application include generation of video data by using a peripheral device such as a camera and transmission of the video data to another network device and display of video data transmitted by another network device on a display.

The communication logic 122 is configured, for example, by a Media Access Control (MAC) bridge (including a switch, a rooting table, etc. for realizing bridge communication between a plurality of ports in the device itself) specified by IEEE 802.1 or a circuit performing operation and control specified by a protocol such as a Spanning Tree Protocol (STP) and a Rapid Spanning Tree Protocol (RSTP).

The ports 123 to 125 perform transmission and reception of frames between network devices. For example, a connector or a cable specified by IEEE 802.3 and hardware conforming to a transmission-reception protocol such as MAC can be used as the ports 123 to 125.

The communication logic 122 and application 121 a connected to adjacent network devices via the ports 123 to 125, thereby configuring the network 100. The connection between the network devices may be a daisy-chain connection composed of network devices 101 to 104 or a star connection composed of network devices 101, 102, 103, and 105. Here, the network devices 101 and 102 are connected by a cable C101, network devices 102 and 103 are connected by a cable C102, and network devices 103 and 104 are connected by a cable C103.

In each network device, a rooting table (not shown in the figure) located in the own device saves information indicating which port of the own device is connected to which port of another network device. As a result, even when a plurality of ports are used, as in the network device 102 or 103, each network device performs communication between the ports of the adequate network device on the basis of this information.

Figure 2:
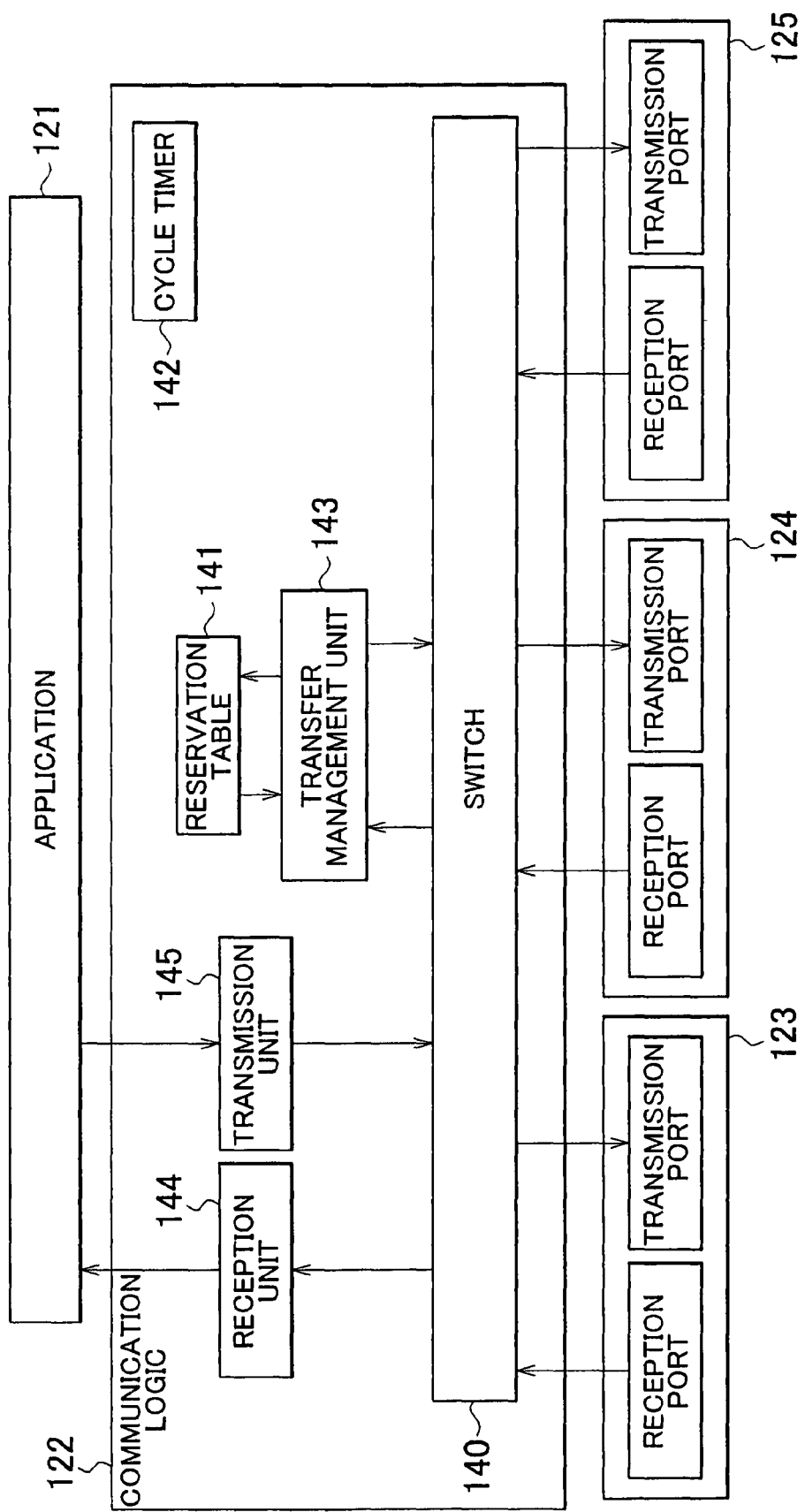
FIG. 2 is a block diagram of a network device of the embodiment of the invention.

FIG. 2 shows in greater detail a configuration block diagram of the network devices 101 to 106 shown in FIG. 1. Because the network devices 101 to 106 have identical configuration, the network device 101 will be explained hereinbelow by way of example. In FIG. 2 components denoted by the same reference numerals as in FIG. 1 have similar configuration and explanation thereof is herein omitted.

Each port from among the ports 123 to 125 has a respective reception port and a transmission port. The reception port sends a frame that arrived from another network device to a below-described switch 140. The transmission port transmits a frame sent from the switch 140 to another network device.

The communication logic 122 has the switch 140, a reservation table 141, a cycle timer 142, a transfer management unit 143, a reception unit 144, and a transmission unit 145.

The switch 140 performs bridge communication between a plurality of ports in the own device, for example, between the reception port of the port 123 and the transmission port of the port 125. Furthermore, the switch sends a frame received by the own device to the reception unit 144 and sends a frame sent from the transmission unit 145 to the transmission port of the designated port. Here, the reception unit 144 sends data received from the switch 140 to the application 121. The transmission unit 145 sends data received from the application 121 to the switch 140. Furthermore, the switch 140 sends to the transfer management unit 143 a frame (pre-reserved frame) for pre-reservation that has been received from another network device.

The reservation management unit 143 obtains reservation information that indicates which time band is reserved by referring to the reservation table 141. The cycle timer 142 measures the time of each cycle in the own device. Because all the network devices within the network have been synchronized, the cycle timers 142 of the network devices show the same time. A method based on IEEE 1588 is conventional as a method for synchronizing network devices. Detailed explanation of IEEE 1588 is herein omitted. The reservation management unit 143 updates the pre-reserved frame on the basis of reservation information described in the pre-reserved frame received from the other network device and information from the reservation table 141. Alternatively, a frame designating a reservation failure is generated. The frame is then sent to the switch 140. In this case, the pre-reserved frame is transferred to the transmission destination. By contrast, the frame indicating the reservation failure is returned to the transmission source. Furthermore, the reservation management unit 143 writes the pre-reservation information to the reservation table 141. The operation of the reservation management unit 143 will be described below in greater detail.

Figure 3:
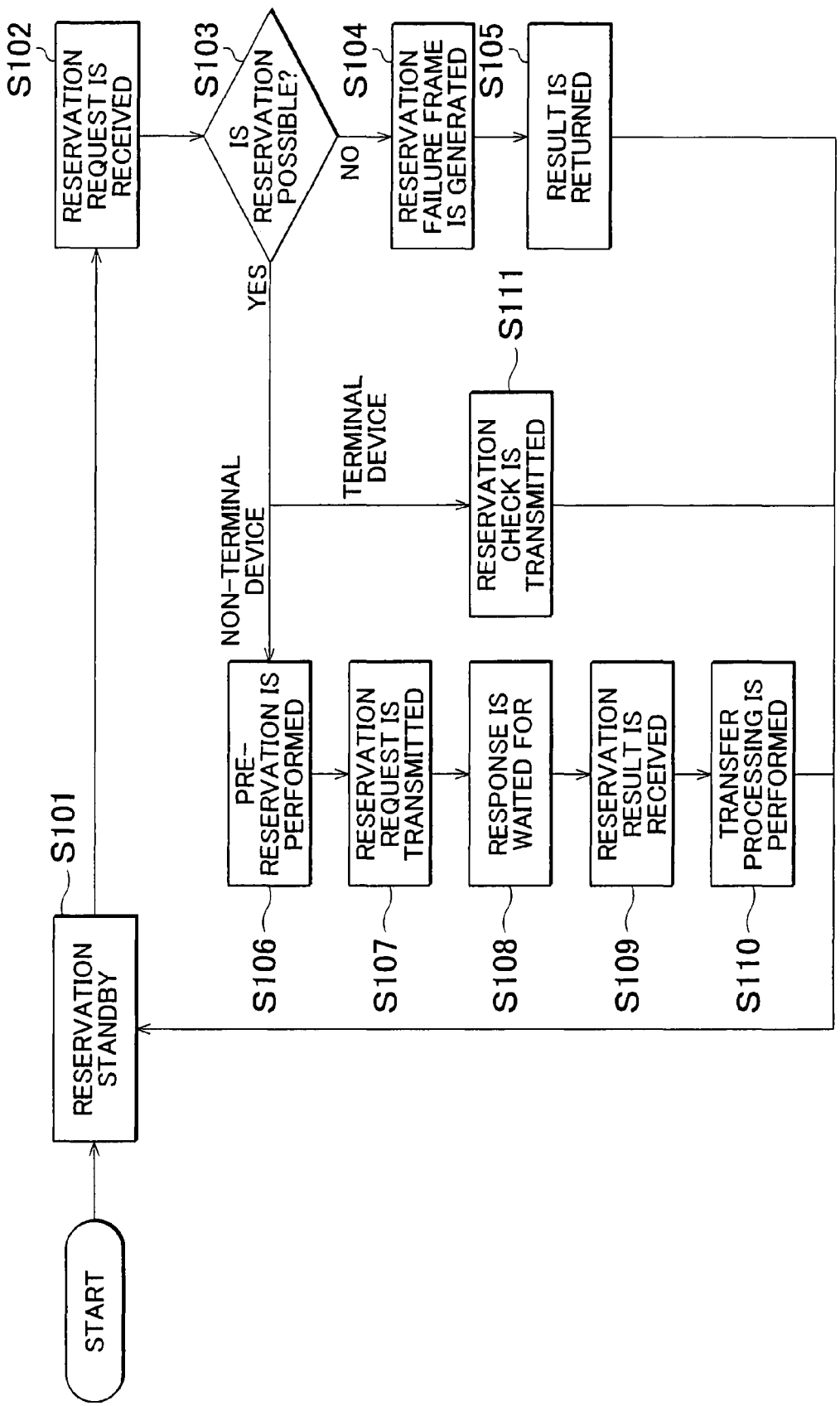
FIG. 3 is a flowchart illustrating a time band reservation method of the embodiment of the invention.

The processing flow of the reservation management unit 143 will be described below by using the flowchart shown in FIG. 3. FIG. 3 shows a processing flow of a network device in which reservation information requested by the frame transmission source is transferred to the frame transmission destination. In this case, the reservation is managed for each port of the network device.

When no reservation is performed, a reservation standby state is assumed (S101). A pre-reserved frame for reserving a predetermined time band within a transfer cycle for frame transmission is transmitted from the frame transmission source. Where the pre-reserved frame is received (S102), the reservation management unit 143 checks a reservation status of the port connected to the frame transmission destination by referring to the reservation table 141 and determines whether the reservation is possible (S103). As will be described below in greater detail, the pre-reserved frame includes information relating to the necessary time and also start time and end time of a time band for pre-reservation. More specifically, for example, information is included that indicates that 10 μsec will be pre-reserved between the 0 to 80 μsec intervals within each 0 to 125 μsec cycle. Where a 10 μsec vacancy is present between the 0 to 80 μsec intervals, it is determined that reservation is possible (S103, YES), and where no such vacancy is present, it is determined that reservation is impossible (S103, NO).

Where the reservation is determined to be impossible, the reservation management unit 143 generates a frame indicating a reservation failure (S104). This frame indicating a reservation failure is then returned to the network device that is a frame transmission source (S105). The system then returns to the reservation standby state (S101).

By contrast, where it is determined that reservation is possible, the operation differs depending on whether the own device is an end relay device in the reservation path, that is, a device for which the next transfer destination is designated as a transmission destination of the pre-reserved frame, or another relay device. Where the own device is not the end relay device, the reservation management unit 143 pre-reserves all the free intervals of the transfer ports in the reservation transfer interval and generates a pre-reserved frame (S106). In the above-described example, where, for example, 20 to 80 μsec are free with respect to a 0 to 80 μsec interval request, all the 20 to 80 μsec intervals are pre-reserved. This pre-reservation information is written to the reservation table 141. A pre-reserved frame is then generated that reflects the necessary time of 10 μsec and information on time bands of 20 to 80 μsec for pre-reservation, this pre-reserved frame is transmitted to a network device that is a transmission destination of the pre-reserved frame (S107), and the system assumes a response waiting state (S108). Once a reservation result has been received from a network device that is a frame transmission destination (S109), this reservation result is transferred to the network device that is a frame transmission source (S110). In this case, the pre-reservation is canceled and pre-reservation information of the reservation table 141 is deleted regardless of whether the reservation result is a success or a failure. When the reservation is successful, the proper reservation information is written to the reservation table 141.

When the own device is an end relay device, a reservation check frame for taking the pre-reservation as a proper reservation is generated and transmitted toward a pre-reserved frame transmission source (S111). In the above-described example, where, for example, 20 to 80 μsec are free with respect to a 0 to 80 μsec request, 20 msec is taken as a reservation registration start time, 30 μsec is taken as a reservation registration end time, and a reservation check frame having this information is generated and transmitted to the pre-reserved frame transmission source. When the time band that can be reserved has a certain width (in the example, 10 μsec within 20 to 80 μsec), it can be randomly set which time band from among a header time band, an end time band, and a central time band is taken for proper reservation.

Figure 4:
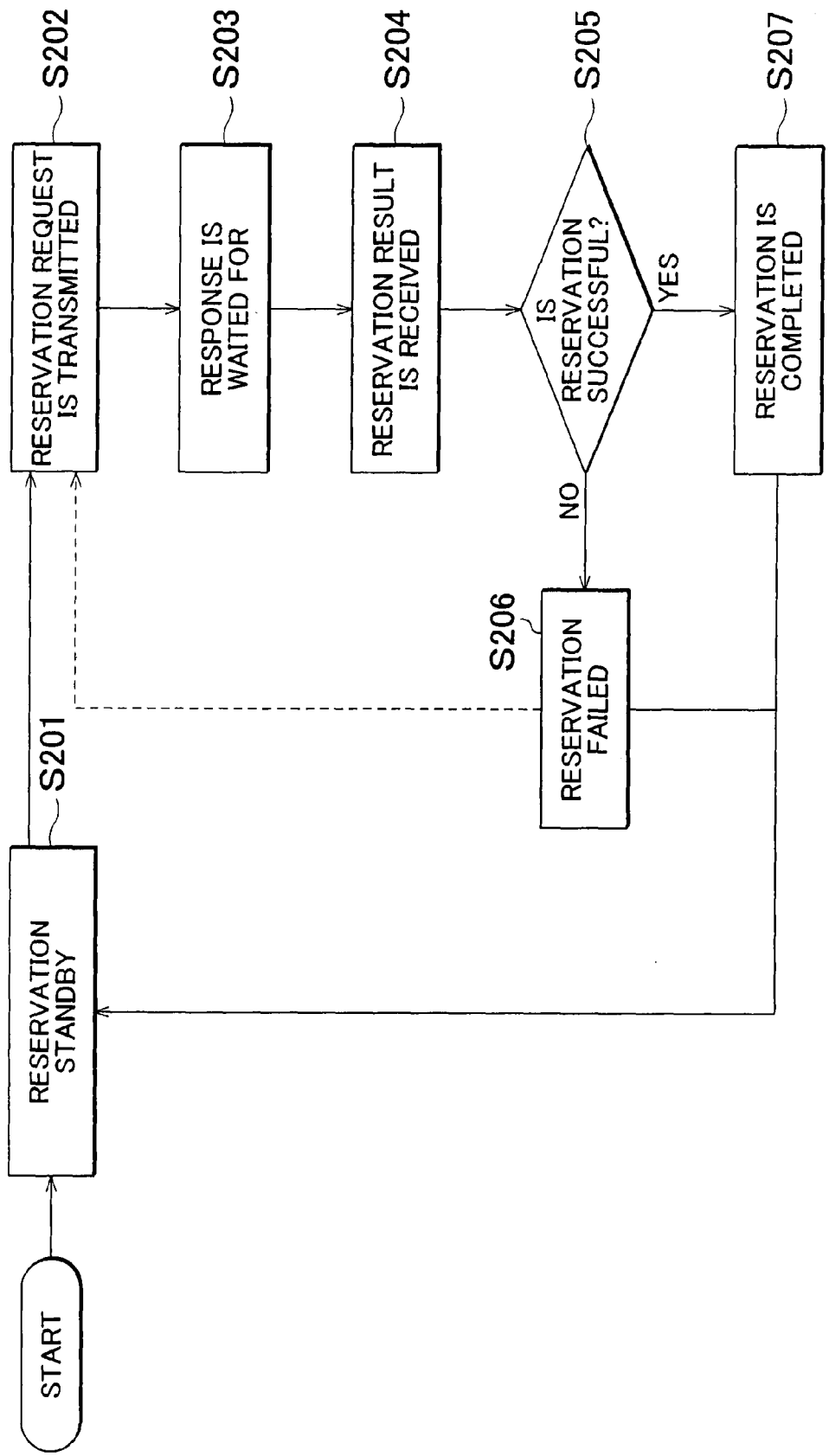
FIG. 4 is a flowchart illustrating a time band reservation method of the embodiment of the invention.

The processing flow of the reservation management unit 143 will be described below by using the flowchart shown in FIG. 4. FIG. 4 shows a processing flow of a network device that is a frame transmission source. When no reservation is performed, a reservation stand-by state is assumed (S201). Where a time band reservation for frame transmission is requested from the application 121 of the device itself, the reservation management unit 143 generates a pre-reserved frame with reference to the reservation table 141. The frame is then transmitted to a frame transmission destination (S202). The system then returns to a response waiting state (S203).

A reservation result is then received from the frame transmission destination (S204). In this case, the pre-reservation is canceled and pre-reservation information of the reservation table 141 is deleted regardless of whether the reservation result is a success or a failure (S206). Resending processing is carrier out in this case according to settings (S202). When the resending processing is not performed or when the resending processing has been performed a predetermined number of times, the system returns to the reservation standby state (S201). When the reservation is successful, proper reservation information is written to the reservation table 141 and reservation is completed (S207). The system then returns to the reservation standby state (S201).

Figure 5:
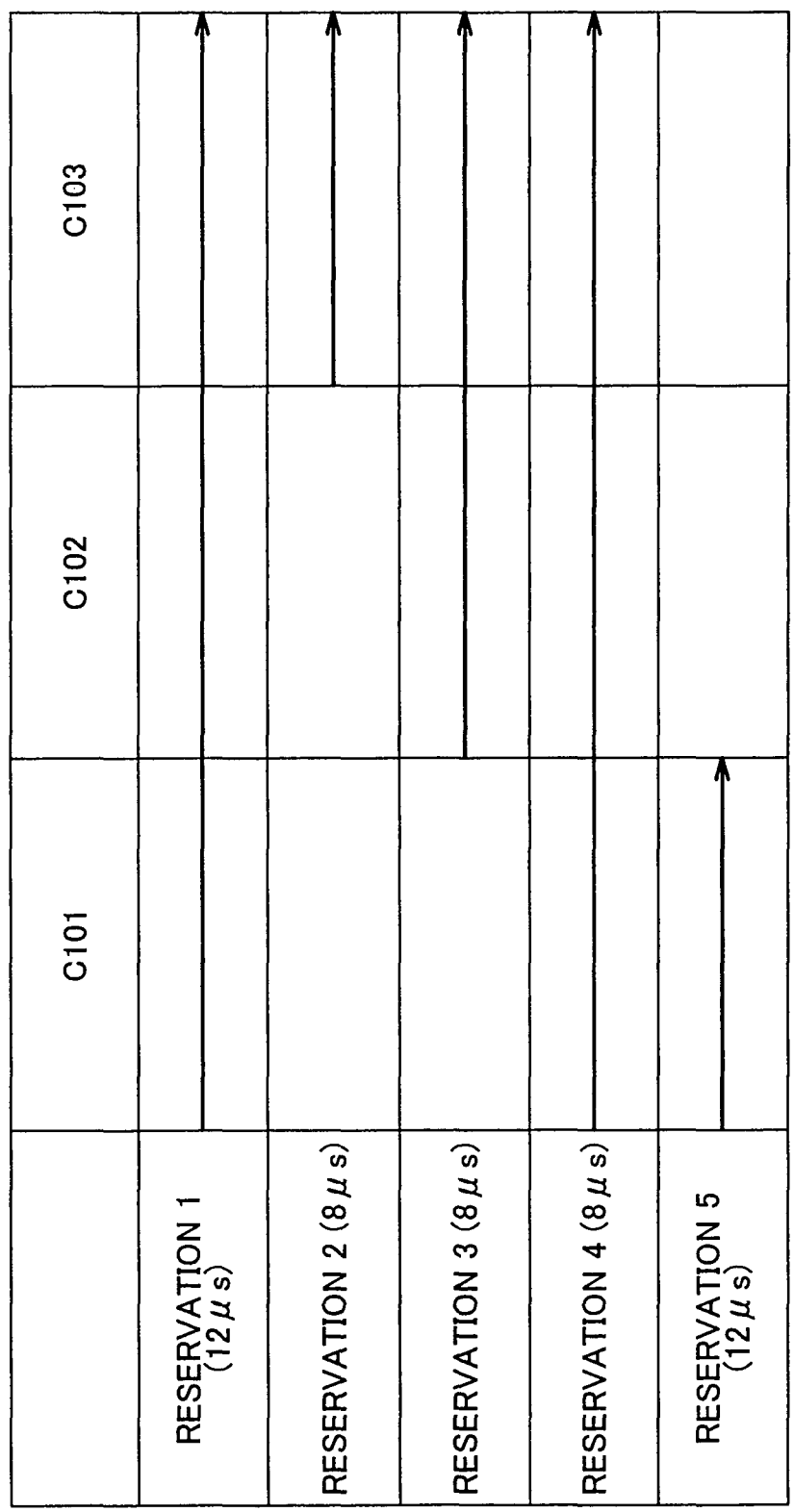
FIG. 5 is a table illustrating a plurality of time band reservation procedures of the embodiment of the invention.

A procedure for performing one reservation is described in detail hereinabove. A procedure for performing a plurality of reservations will be described below with reference to FIGS. 5 to 10. In this case, individual reservation procedures are same as described above. FIG. 5 is an example of a reservation table of transmission ports connected to the cables C101 to C103 shown in FIG. 1. For example, a reservation status of a transmission port connected to the cable C101 can be understood by referring to a reservation status of the transfer port of the network device 101 connected to the cable C101.

A reservation 1 in FIG. 5 is the initially performed reservation. This is a 12-μsec-width time band reservation for frame transfer from the network device 101 to the network device 104 shown in FIG. 1. A reservation 2 is the second performed reservation. This is a 8-μsec-width time band reservation for frame transfer from the network device 103 to the network device 104 shown in FIG. 1. A reservation 3 is the third performed reservation. This is a 8-μsec-width time band reservation for frame transfer from the network device 102 to the network device 104 shown in FIG. 1. A reservation 4 is the fourth performed reservation. This is an 8-μsec-width time band reservation for frame transfer from the network device 101 to the network device 104 shown in FIG. 1. A reservation 5 is the fifth performed reservation. This is a 12-μsec-width time band reservation for frame transfer from the network device 101 to the network device 102 shown in FIG. 1.

Reservation procedures of reservations 1 to 5 shown in FIG. 5 will be explained below one by one with reference to FIGS. 6 to 10. FIGS. 6 to 10 show transfer cycle patterns indicating a reservation status of each transmission port connected to the cables C101 to C103. In the figures, cycle patterns corresponding to the transmission ports connected to the cables C101 to C103 are compared. Before the reservation 1 is performed, absolutely no time band is reserved within the cycle in all the transmission ports connected to the cables C101 to C103.

Figure 6:
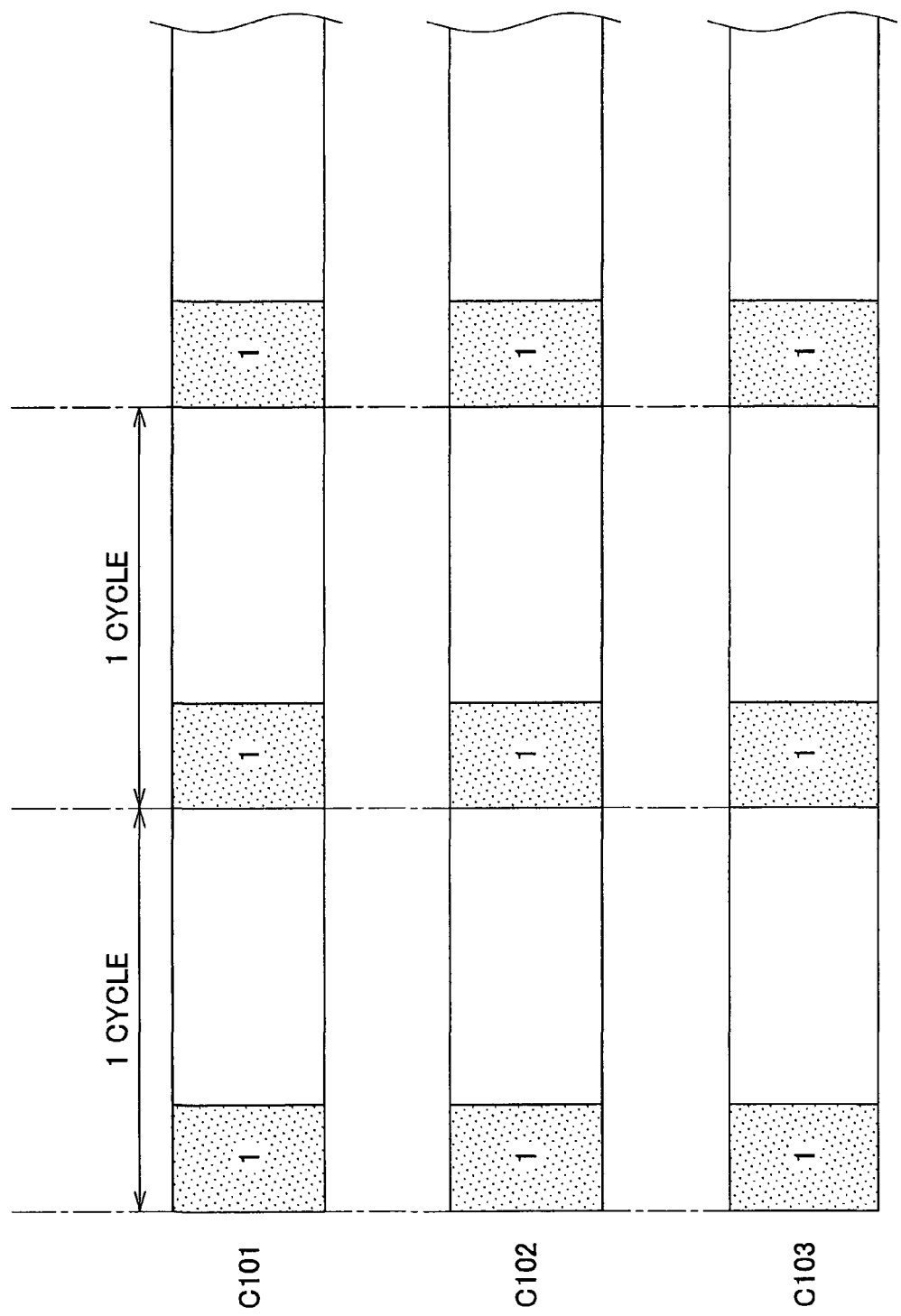
FIG. 6 is a transfer cycle diagram illustrating a plurality of time band reservation procedures of the embodiment of the invention.

In this case, where the reservation 1 is performed, as shown in FIG. 6, a time band with a width of 12 μsec corresponding to the reservation 1 is reserved in the initial interval of each cycle of the transmission ports connected to the cables C101 to C103.

Figure 7:
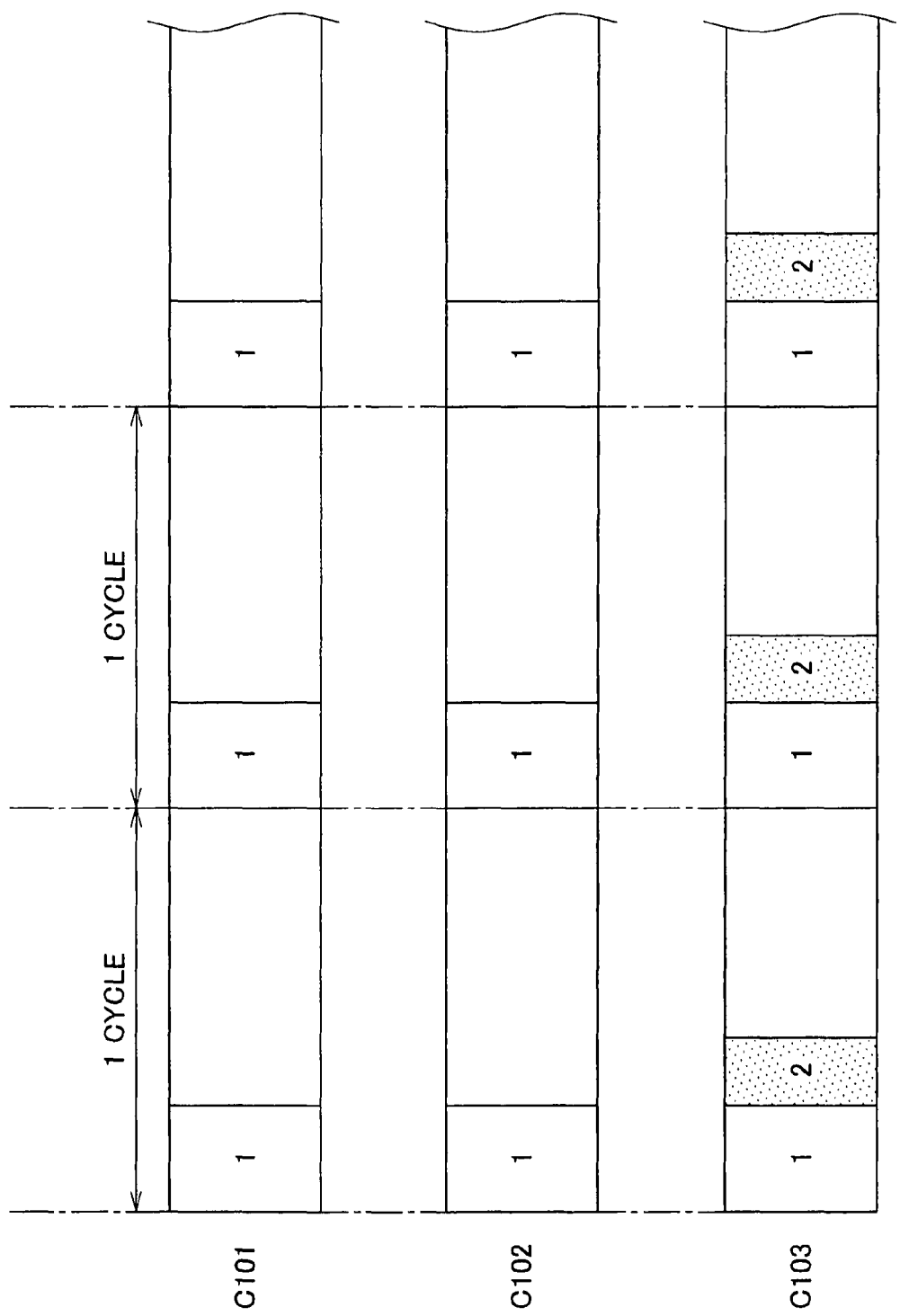
FIG. 7 is a transfer cycle diagram illustrating a plurality of time band reservation procedures of the embodiment of the invention.

Then, where the reservation 2 is performed, as shown in FIG. 7, a time band with a width of 8 μsec corresponding to the reservation 2 is reserved adjacently to the reservation 1 of the transmission port connected to the cable C103. Because the frame transfer of reservation 2 uses only the transmission port connected to the cable C103, only the transmission port connected to the cable C103 is reserved.

Figure 8:
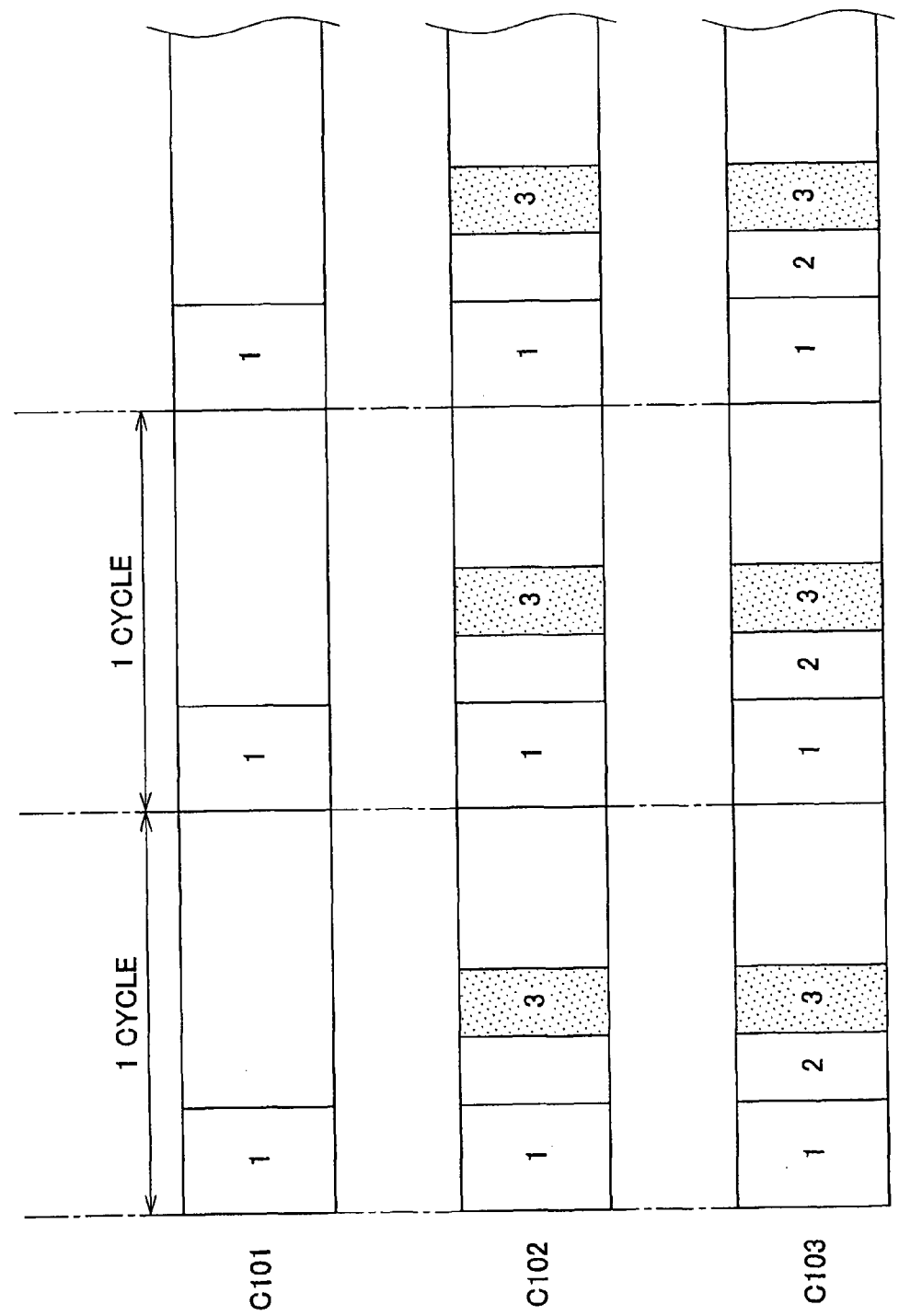
FIG. 8 is a transfer cycle diagram illustrating a plurality of time band reservation procedures of the embodiment of the invention.
Figure 9:
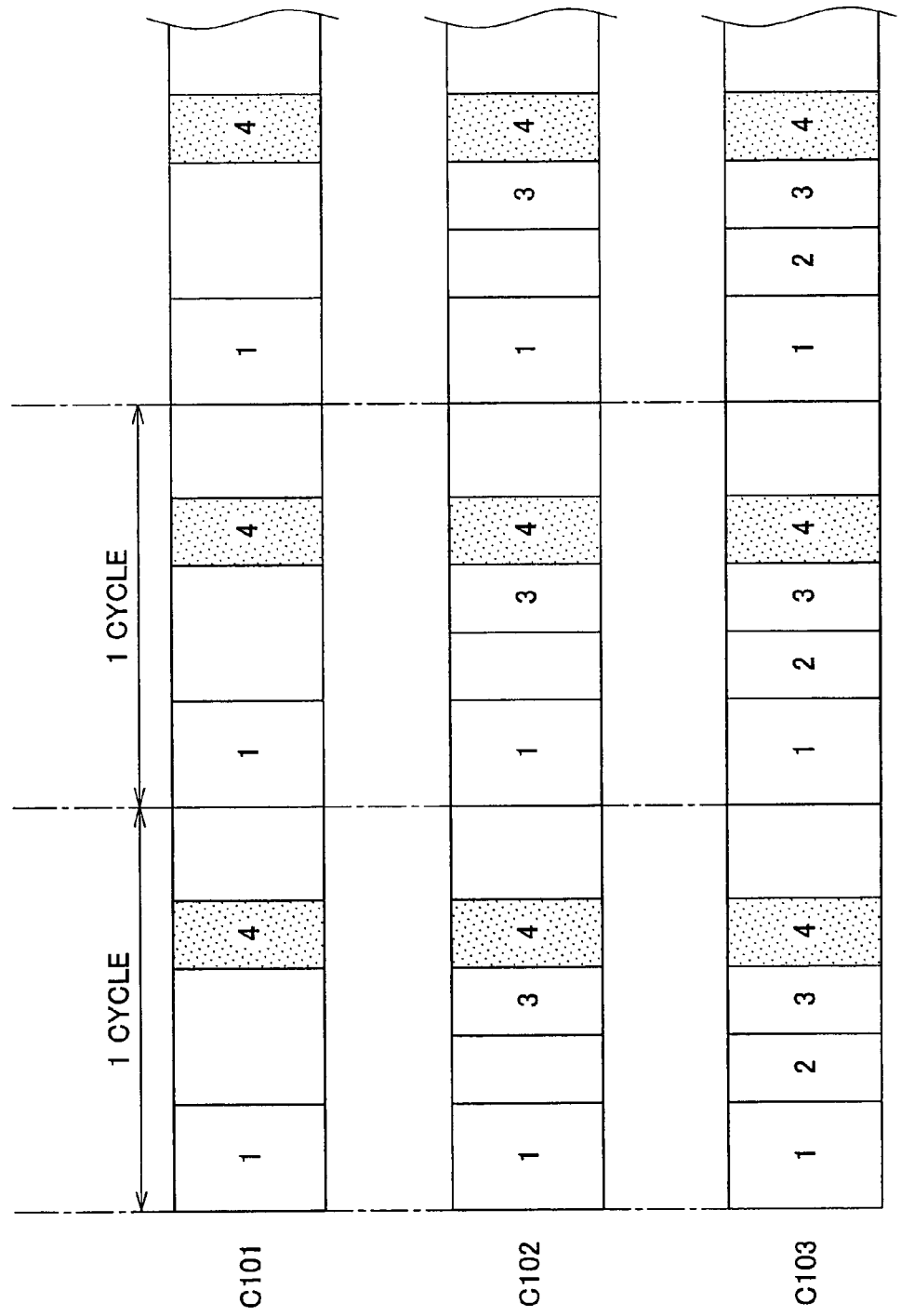
FIG. 9 is a transfer cycle diagram illustrating a plurality of time band reservation procedures of the embodiment of the invention.
Figure 10:
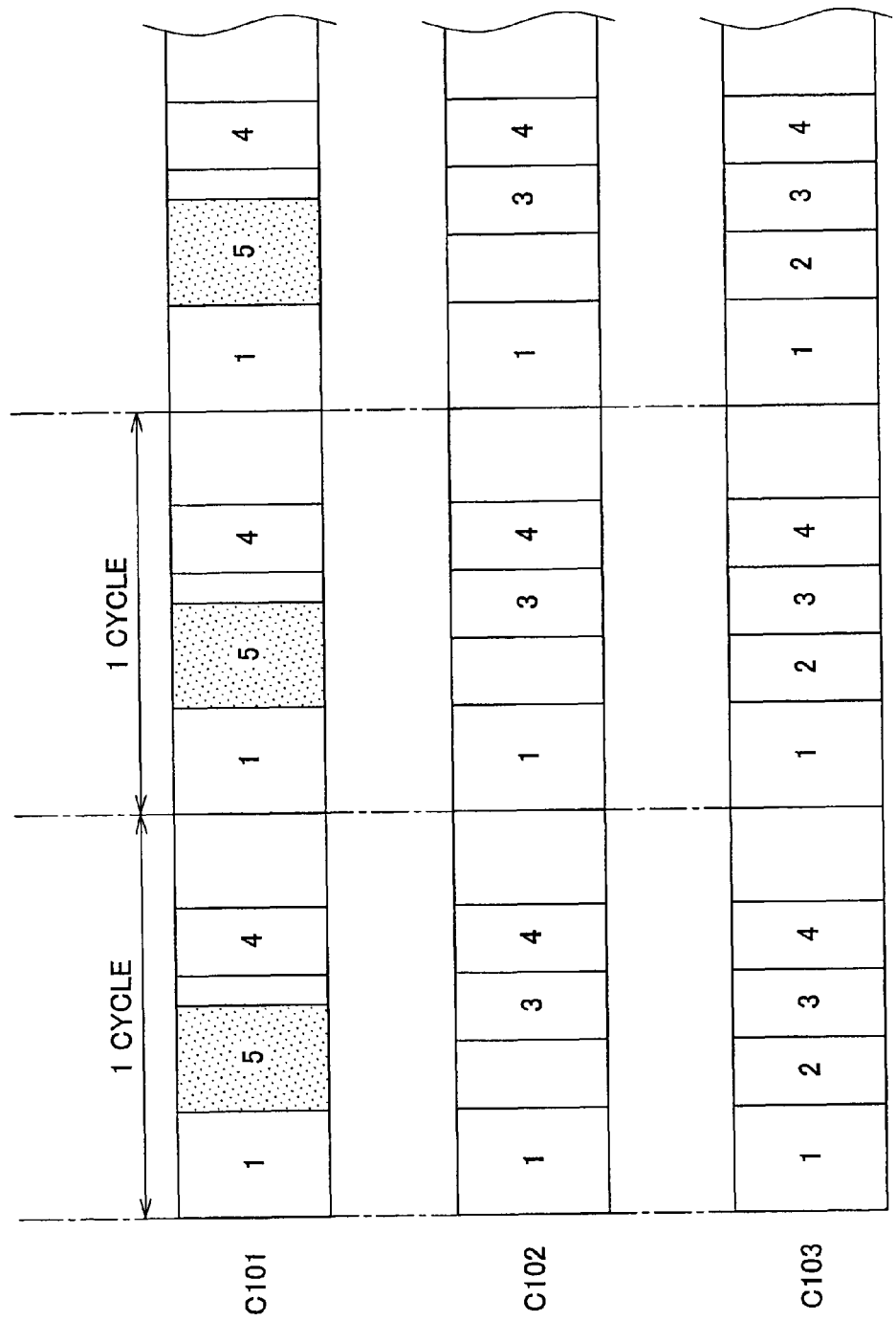
FIG. 10 is a transfer cycle diagram illustrating a plurality of time band reservation procedures of the embodiment of the invention.

Then, where the reservation 3 is performed, as shown in FIG. 8, a time band with a width of 8 μsec corresponding to the reservation 3 is reserved adjacently to the reservation 2 of the transmission port connected to the cable C103. Furthermore, in the transmission port connected to the cable C102, a time band with a width of 8 μsec corresponding to the reservation 3 is also reserved at a time identical to that of the reservation 3 of the transmission port connected to the cable C103. Thus, in the transmission port connected to the cable C102, a time band between the reservation 1 and the reservation 3 is a free time with a width of 8 μsec. Because the frame transfer of reservation 3 does not use the transmission port connected to the cable C101, the transmission port connected to the cable C101 is not reserved.

Where the reservation 4 is then performed, as shown in FIG. 9, a time band with a width of 8 μsec corresponding to the reservation 4 is reserved adjacently to the reservation 3 of the transmission port connected to the cable C102 and the transmission port connected to the cable C103. Furthermore, in the transmission port connected to the cable C101, a time band with a width of 8 μsec corresponding to the reservation 4 is also reserved at a time identical to that of the reservation 4 of the transmission port connected to the cable C102 and the transmission port connected to the cable C103. Thus, in the transmission port connected to the cable C101, a time band between the reservation 1 and the reservation 4 becomes a free time with a width of 16 μsec that has not been reserved.

Where the reservation 5 is then performed, as shown in FIG. 10, a time band with a width of 12 μsec corresponding to the reservation 5 is reserved adjacently to the reservation 1 of the transmission port connected to the cable C101. The frame transfer of reservation 5 is for using only the transmission port connected to the cable C101. This is also because, as was described hereinabove, a 16 μsec free time is present between the reservation 1 and the reservation 4. In the above-described procedure, a plurality of reservations are performed.

As described hereinabove, identical reservation is made in the same time band in all the paths relating thereto. As a result, a delay for which the cycle explained using FIG. 16 is taken as a unit does not occur. Thus, data can be transferred from the transmission source to the transmission destination within the same cycle. Therefore, the reserved frame can be transferred with a small delay.

Figure 11:
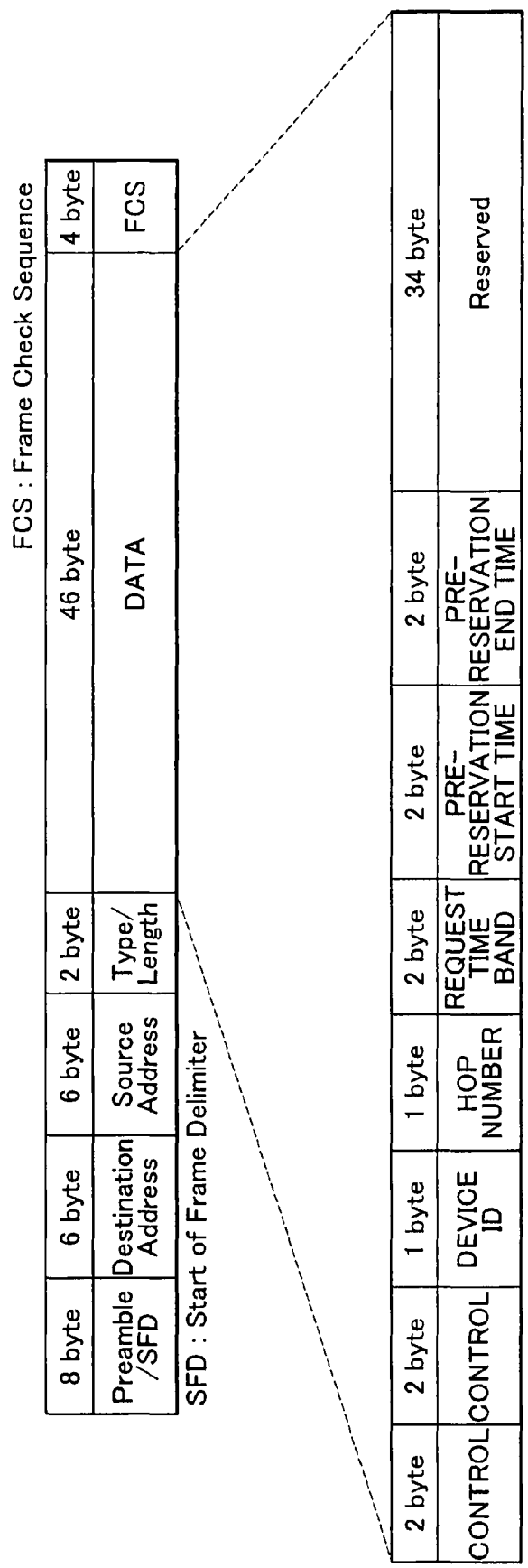
FIG. 11 is a schematic diagram of a pre-reserved frame of the embodiment of the invention.

FIG. 11 shows an example of a pre-reserved frame. In the MAC frame of IEEE 802.3, a 7 byte Preamble, a 1 byte Start of Frame Delimiter (SFD), a 6 byte Destination Address, a 6 byte Transmission Source Address, and a 2 byte Type are arranged in the header of each cycle. These are followed by DATA, and finally a Frame Check Sequence (FCS) is arranged. In the embodiment, 4 byte control data, 1 byte device ID information, 1 byte hop number information, 2 byte required time band information, and pre-reservation start time information and pre-reservation end time information, each of 2 bytes, are arranged at the very end of the header, that is, at the leading end of DATA.

Figure 12:
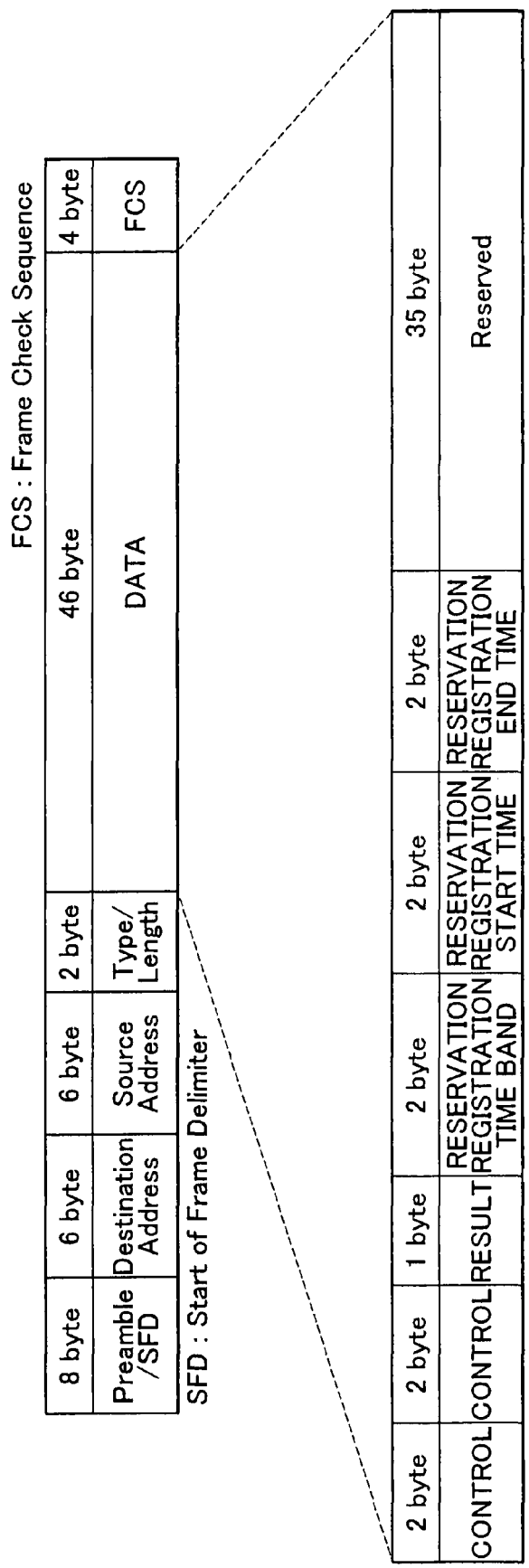
FIG. 12 is a schematic diagram of a reservation check frame of the embodiment of the invention.

FIG. 12 shows an example of the reservation check frame. Here, 1 byte reservation result information is arranged instead of the 1 byte device ID information and 1 byte hop number information in the pre-reserved frame shown in FIG. 11. Furthermore, 2 byte reservation registration time band information is arranged instead of the 2 byte required time band information. In addition, reservation registration start time information and reservation registration end time information, each of 2 bytes, are arranged instead of the pre-reservation start time information and pre-reservation end time information, each of 2 bytes.

In the explanation above, a cable-induced delay (cable delay) and data repeat delay (repeat delay) within the network device are not discussed. However, actually the reservation has to be executed by taking both delays into account. A method for inhibiting the effect of these delays will be described below. For example, in a frame transfer from the network device 101 to the network device 104 via the cables C101 to C103 shown in FIG. 1, the hop number is 3 and equal to the number of cables between the devices. Assuming that the repeat delay is 450 ns and the cable delay is 50 ns, the total delay caused by the two factors is 450 ns×2+50 ns×3=1.05 μsec. Where the hop number is denoted by N, the total delay is 450 ns×(N−1)+50 ns×N. Therefore, it is obvious that the larger is the N, the larger is the total delay.

Reservation is usually possible for all the network devices of a network. Therefore, in order to make the cable delay and repeat delay equal to or less than predetermined values, it is necessary to prohibit a reservation with a large hop number. In the embodiment, hop number information is contained in a pre-reserved frame as shown in FIG. 11. Therefore, when a predetermined hop number if exceeded, this reservation can be inhibited. More specifically, a hop number is counted each time one network device is passed, and the reservation management unit 143 updates the hop number information. When a hop number established in advance is exceeded, a reservation failure is sent back to the pre-reservation transmission source. As a result, cable delay and repeat delay can be inhibited to values equal to or less than predetermined values.

A priority processing performed when the pre-reserved frames compete will be explained below. The reservation for a frame transfer from the network device 101 to the network device 103 via the network device 102 shown in FIG. 1 will be considered. The reservation for a frame transfer from the network device 105 to the network device 103 via the network device 102 will be also considered. Because the two frame transfers are performed via the network device 102, the pre-reserved frames can compete. When a pre-reserved frame is transferred, all the free time bands are pre-reserved. Therefore, two or more reservation processing operations cannot be performed simultaneously. Therefore, when pre-reserved frames compete, any one of the pre-reserved frames has to be processed prior to the other.

Here, determination based on a destination address of a MAC frame specified in IEEE 802.3 can be also considered. However, as shown in FIGS. 11 and 12, the destination address is set to 6 byte. Priority cannot be determined based on such a destination address alone. Accordingly, in the embodiment, a device ID is assigned to each network device, and a priority processing is executed based on the device ID. In the embodiment, a pre-reserved frame includes device ID information, as shown in FIG. 11. In this case, where the number of network devices is equal to or less than 100, device ID information of 1 byte is sufficient. As a result, high-speed processing is possible.

Figure 13:
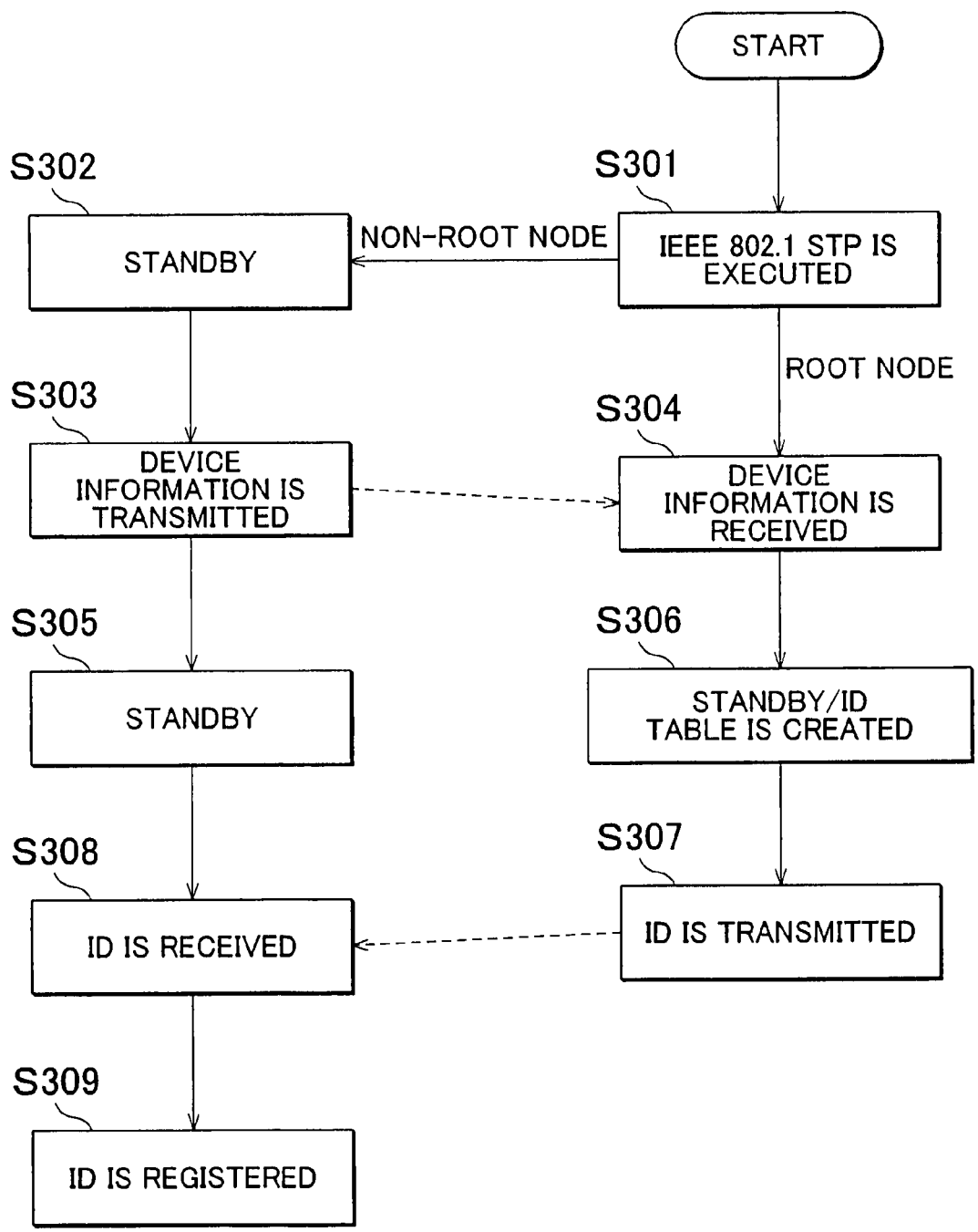
FIG. 13 is a flowchart illustrating a design ID assignment method of the embodiment of the invention.
Figure 14:
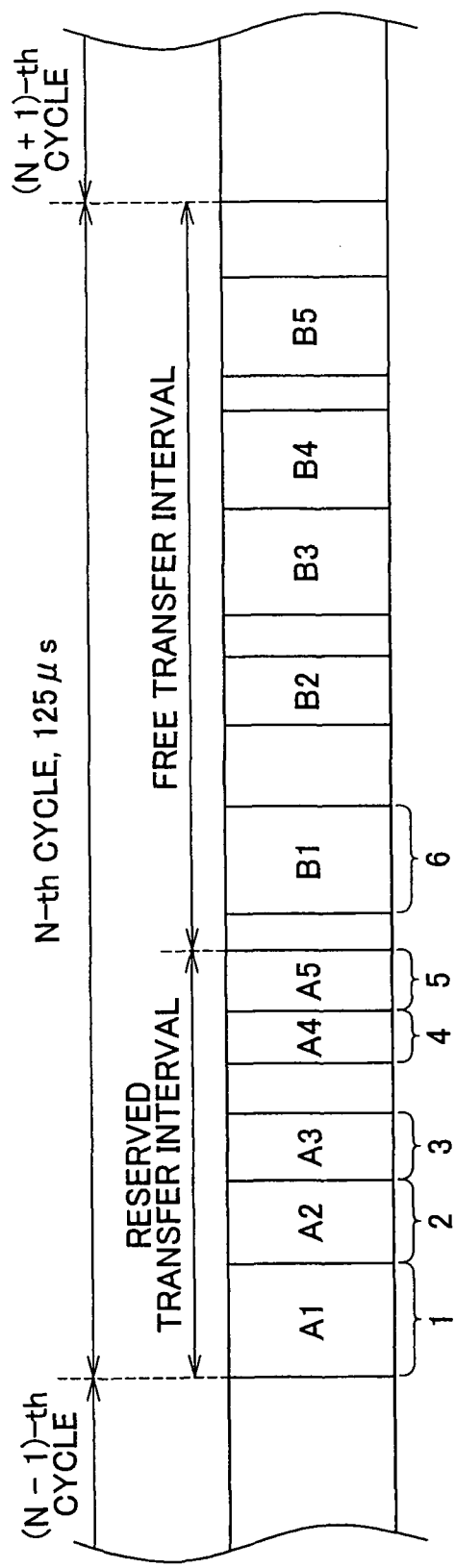
FIG. 14 illustrates an example of a frame transfer cycle of the related technology.
Figure 15:
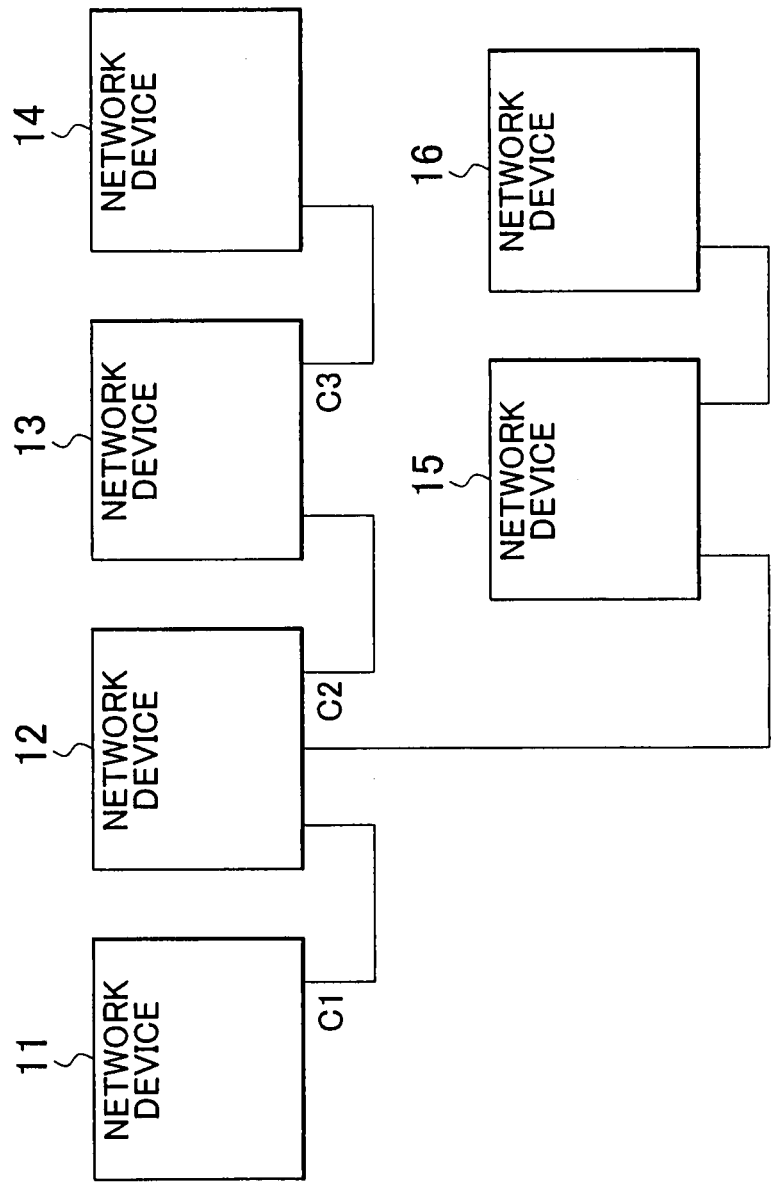
FIG. 15 is a schematic diagram of a network of the related technology.

A method for assigning the device ID will be explained below with reference to FIG. 13. In a spanning tree specified in IEEE 802.1, a root node within the network is determined. In the embodiment, a device ID is assigned to each network device by using a method for determining the root node. In this case, if the ID assignment is simply added to the spanning tree, initialization processing becomes complex. More specifically, in the network creation process, root nodes are frequently changed and a device ID is assigned with each change. As a result, the network is flooded with frames and a long time is required to complete initialization.

For this reason, in the embodiment, the system stands by for a predetermined time before the device ID assignment is started. More specifically, a timer is actuated at a point in time at which it is determined whether the port state of the network device is forward or block in the spanning tree procedure. The system then waits for a time that has been set in advance. Where the port state is not changed after the standby period, the network is determined to be stable and the device ID assignment is started.

A flow of device ID assignment will be explained below by using the flowchart shown in FIG. 13. Where a STP specified in IEEE 802.11 is executed, it is determined whether the network device is a root node (S301). When the network device is not a root node, the system makes a transition to a standby state (S302). Where the port state has not changed after waiting for a preset time, device information for determining the priority is broadcasted within the network (S303). A MAC address, bridge priority information, and values set by the application 121 of the device correspond to this device information. After the device information has been transmitted, the system makes a transition to a standby state (S305) and waits till a device ID is assigned from the root.

By contrast, where the network device is a root node, device information transmitted from a non-root node is received (S304). A table (ID table) for assigning a device ID to all the non-root nodes is then created on the basis of device information from all the non-root nodes (S306). More specifically, the non-root nodes are rearranged according to the level of determined priority. In this case, the system waits for a preset time to receive device information from all the non-root nodes. The device ID of the network device is then transmitted to each non-root node (S307).

The non-root node that has been waiting receives a device ID of the device that has been transmitted from the root node (S308). The own device ID is then registered in the device (S309). The device ID determined by the above-described procedure is inserted in a pre-reserved frame as shown in FIG. 11. As a result, when pre-reserved frames compete, it can be rapidly determined which frame has a priority. More specifically, device IDs described in both frames are compared and the determination can be rapidly made on the basis of the preset determination criterion.

As described hereinabove, with the invention, the reservation of the same frame transfer is made in the same time band in all the paths relating thereto. As a result, data can be transferred from the transmission source to the transmission destination within the same cycle. Furthermore, by prohibiting the transfer in excess of a predetermined hop number, it is possible to inhibit the cable delay and repeat delay to a value that is equal to or lower than a predetermined value. Furthermore, by assigning a device ID to each network device, it is possible to determine rapidly which frame has a priority when pre-reserved frames compete.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configuration, including more, less or only a single element, are also within the spirit and scope of the invention.

The invention claimed is:

1. A network system comprising:
    a plurality of network devices that transfer frames by repeating, in a constant cycle, a reserved transfer interval that is a time band, in which a frame is transferred with a reservation, and a free transfer interval that is a time band, in which a frame is freely transferred;
    a first network device that transmits a frame;
    a second network device that is a transmission destination of the frame; and
    a relay network device, which links the first network device and the second network device, wherein
    the first network device transmits a first pre-reserved frame for reserving the frame to the relay network device,
    the relay network device determines whether the frame reservation is possible by checking a reservation status which is stored within the relay network device, and if the frame reservation is determined to be possible the relay network device produces, based on the first pre-reserved frame, a second pre-reserved frame and transmits the second pre-reserved frame to the second network device,
    the second network device determines whether the frame reservation is possible by checking a reservation status which is stored within the second network device, and if the frame reservation is determined to be possible the second network device produces, based on the second pre-reserved frame, a reservation check frame and transmits the reservation check frame to the relay network device,
    the first pre-reserved frame includes a reservation start time A and a reservation end time B in a predetermined communication cycle, and a required time band C,
    the relay network device determines whether a free time band that is equal to or greater than the required time band C is present within a time band from the reservation start time A to the reservation end time B in the predetermined communication cycle, and produces and transmits the second pre-reserved frame that includes a reservation start time D and a reservation end time E within the free time band and the required time band C when it is determined that the free time band is present,
    the second network device determines whether a free time band that is equal to or greater than the required time band C is present within a time band from the reservation start time D to the reservation end time E in the predetermined communication cycle, and produces and transmits the reservation check frame that includes a reservation registration start time and a reservation registration end time within the free time band when it is determined that the free time band is present, and
    the first network device and the relay network device determine a reserved time band within the predetermined communication cycle based on the reservation registration start time and the reservation registration end time that are included in the reservation check frame.

2. The network system according to claim 1, wherein the relay network device comprises a reservation table including reserved time band information and determines whether reservation is possible based on the time band information of the received pre-reserved frame and time band information of the reservation table.

3. The network system according to claim 2, wherein the relay network device determines that reservation is possible when a free time band that is equal to or greater than the required time band is present within the reservation start time and end time.

4. The network system according to claim 3, wherein the relay network device produces and transmits the pre-reserved frame by taking the free time band as the start time and end time.

5. The network system according to claim 1, wherein the reservation processing is prohibited when a hop number from the first network device to the second network device exceeds a predetermined value.

6. The network system according to claim 1, wherein a device ID is assigned to all network devices within the network other than root nodes and whether each network device prioritizes a reservation from any of the network devices is determined based on the device ID, whereby the reservation processing is executed.

7. The network system according to claim 6, wherein
the first or second pre-reserved frame includes time band information for reserving the frame and information of the device ID.

8. The network system according to claim 1, wherein the reserved time band is the same for each of the first network device, the relay network device, and the second network device within the predetermined communication cycle.

9. A frame transfer method performed in a plurality of network devices by repeating, in a constant cycle, a reserved transfer interval that is a time band, in which a frame is transferred with a reservation and a free transfer interval that is a time band, in which a frame is freely transferred, comprising:
transmitting, using a first network device that transmits a frame, a first pre-reserved frame for reserving the frame to a relay network device,
determining, using the relay network device, whether the frame reservation is possible by checking a reservation status which is stored within the relay network device, and if the frame reservation is determined to be possible producing, based on the first pre-reserved frame, a second pre-reserved frame and transmitting the second pre-reserved frame to a second network device,
determining, using the second network device, whether the frame reservation is possible by checking a reservation status which is stored within the second network device, and if the frame reservation is determined to be possible producing, based on the second pre-reserved frame, a reservation check frame and transmitting the reservation check frame to the relay network device, wherein
the first pre-reserved frame includes a reservation start time A and a reservation end time B in a predetermined communication cycle, and a required time band C,
it is determined by the relay network device whether a free time band that is equal to or greater than the required time band C is present within a time band from the reservation start time A to the reservation end time B in the predetermined communication cycle, and the second pre-reserved frame that includes a reservation start time D and a reservation end time E within the free time band and the required time band C is produced and transmitted by the relay network device when it is determined that the free time band is present,
it is determined by the second network device whether a free time band that is equal to or greater than the required time band C is present within a time band from the reservation start time D to the reservation end time E in the predetermined communication cycle, and the reservation check frame that includes a reservation registration start time and a reservation registration end time within the free time band is produced and transmitted by the second network device when it is determined that the free time band is present, and
a reserved time band within the predetermined communication cycle is determined by the first network device and the relay network device based on the reservation registration start time and the reservation registration end time that are included in the reservation check frame.

10. The frame transfer method according to claim 9, wherein the relay network device comprises a reservation table including reserved time band information and determines whether reservation is possible based on time band information of the received pre-reserved frame and time band information of the reservation table.

11. The frame transfer method according to claim 10, wherein the relay network device determines that reservation is possible when a free time band that is equal to or greater than the required time band is present within the reservation start time and end time.

12. The frame transfer method according to claim 11, wherein the relay network device produces and transmits the pre-reserved frame by taking the free time band as the start time and end time.

13. The frame transfer method according to claim 9, wherein the reservation processing is prohibited when a hop number from the first network device to the second network device exceeds a predetermined value.

14. The frame transfer method according to claim 9, wherein a device ID is assigned to all network devices within the network other than root nodes, and whether each network device prioritizes a reservation from any of the network devices is determined based on the device ID, whereby the reservation processing is executed.

15. The frame transfer method according to claim 14, wherein
the first or second pre-reserved frame includes time band information for reserving the frame and information of the device ID.

16. The frame transfer method according to claim 9, wherein the reserved time band is the same for each of the first network device, the relay network device, and the second network device within the predetermined communication cycle.

17. A network device that transfers frames by repeating, in a constant cycle, a reserved transfer interval that is a time band, in which a frame is transferred with a reservation and a free transfer interval that is a time band, in which a frame is freely transferred, comprising:
a reservation table including information concerning a reserved time band within the reserved transfer interval; and
a reservation management unit, wherein:
upon reception of a first pre-reserved frame that includes a reservation start time A and a reservation end time B in a predetermined communication cycle and a required time band C from a first network device, the reservation management unit determines, with reference to the reservation table, whether a free time band that is equal to or greater than the required time band C is present within a time band from the reservation start time A, to the reservation end time B in the predetermined communication cycle, and when it is determined that the free time band is present, the reservation management unit produces a second pre-reserved frame that includes a reservation start time D and a reservation end time E within the free time band and the required time band C, and transmits the second pre-reserved frame to the second network device, and upon reception of a reservation check frame that is produced based on the second pre-reserved frame and that is used to take a pre-reservation as a proper reservation from the second network device, the reservation management unit determines a reserved time band within the predetermined communication cycle based on a reservation registration start time and a reservation registration end time that are included in the reservation check frame, and transmits the reservation check frame to the first network device.

18. The network device according to claim 17, wherein the reserved time band is the same for each of the first network device, the network device, and the second network device within the predetermined communication cycle.

* * * * *